(12) United States Patent
Wato et al.

(10) Patent No.: US 7,165,807 B2
(45) Date of Patent: Jan. 23, 2007

(54) MOLDING FIXING STRUCTURE, ROOF MOLDING AND FIXING CLIP

(75) Inventors: Yasuhiro Wato, Aichi (JP); Hiroshi Ohkubo, Saitama (JP); Masuyuki Kakizaki, Tokyo (JP)

(73) Assignees: Tokai Kogyo Co., Ltd., Aichi (JP); Honda Montor Co., Ltd., Tokyo (JP)

( * ) Notice: Subject to any disclaimer, the term of this patent is extended or adjusted under 35 U.S.C. 154(b) by 44 days.

(21) Appl. No.: 11/048,798

(22) Filed: Feb. 3, 2005

(65) Prior Publication Data
US 2005/0189793 A1 Sep. 1, 2005

(30) Foreign Application Priority Data
Feb. 3, 2004 (JP) ............................ P2004-027022

(51) Int. Cl.
*B60R 13/04* (2006.01)
(52) U.S. Cl. ..................................... 296/210
(58) Field of Classification Search ................ 296/210, 296/213, 93
See application file for complete search history.

(56) References Cited

U.S. PATENT DOCUMENTS 5,013,083 A * 5/1991 Yada et al. ................. 296/213

FOREIGN PATENT DOCUMENTS

| JP | 10-86765 A | 4/1998 |
|---|---|---|
| JP | 2606190 | 7/2000 |
| JP | 2003-25930 A | 1/2003 |

* cited by examiner

*Primary Examiner*—Joseph D. Pape
(74) *Attorney, Agent, or Firm*—Westerman, Hattori, Daniels & Adrian, LLP.

(57) ABSTRACT

In a molding fixing structure, a T-stud stood within a roof groove is inserted into a T-stud insertion hole of a fixing clip, and then a roof molding is moved in a longitudinal direction of the roof groove with respect to the T-stud to insert the T-stud into a T-stud fixing hole of the fixing clip. A base plate portion of the fixing clip includes a bottom portion positioned lower than a lower surface of a head portion of the T-stud when the T-stud is inserted into the T-stud insertion hole, a guide portion that extends obliquely upward from the bottom portion toward a longitudinal center side of the roof molding and is in sliding contact with the lower surface of the head portion of the T-stud, and a top portion formed in the guide portion and positioned higher than the lower surface of the head portion.

11 Claims, 9 Drawing Sheets

MOLDING FIXING STRUCTURE, ROOF MOLDING AND FIXING CLIP

BACKGROUND OF THE INVENTION

1. Field of the Invention

The present invention relates to a molding fixing structure in which a roof molding of an elongated shape is fixed along a roof groove provided along a longitudinal direction of a vehicle at a side edge portion of a roof panel of a vehicle body, and more particularly to a molding fixing structure in which a fixing clip is fixed to a lower surface side of the roof molding to be fit to and fixed to a T-stud stood within the roof groove.

2. Description of the Related Art

An example of such a kind of molding fixing structure is disclosed in Japanese Utility Model registration No. 2606190. The molding fixing structure disclosed in Japanese Utility Model registration No. 2606190 is "a roof molding fixing structure for a vehicle in which a stud having a head portion (T-stud) is stood within a groove formed at a connecting portion between a roof panel and an outside panel, a clip continuously provided at a bottom plate with an insertion hole and a fixing hole of a small width is fixed to an end portion of a roof molding, and the stud is inserted into the insertion hole and then relatively moved to the fixing hole thereby to fix the roof molding to the groove, wherein the clip is provided with erecting portions erected from both ends of the bottom plate in the longitudinal direction thereof, horizontal portions extending in the longitudinal direction from the erecting portions, and engagement hooks extending from the both sides of the horizontal portions so as to be able to bite the roof molding, respectively."

In the aforesaid roof molding fixing structure, when fixing the roof molding to a predetermined position of a vehicle body panel, the insertion hole of the clip fixed to the roof molding is arranged almost just above the stud (T-stud) of the groove (roof groove). The roof molding is then inserted into the groove as it is and the head portion of the stud is relatively inserted into the insertion hole of the clip. Then, a forward end portion of the roof molding in the longitudinal direction thereof is pushed toward a bottom wall of the groove portion and the roof molding is moved in the longitudinal direction while being pushed. In this way, the head portion of the stud is inserted into the fixing hole continuing to the insertion hole thereby to fix the roof molding to the groove through the clip engaged with the stud.

Further, as described above, it is indispensable, after positioning the insertion hole of the clip attached to the roof molding with respect to the stud within the groove along the longitudinal direction of the vehicle, to push the roof molding into the groove at the position. Thus, in the aforesaid procedure, both the clip fixed to the lower surface side of the roof molding and the stud fixed to the groove cannot be viewed by a worker since they are hidden by the roof molding (or positioned at a blind spot). Accordingly, the fixing work of the roof molding requires much skill and attention.

SUMMARY OF THE INVENTION

An object of the invention is to provide a molding fixing structure, a molding with fixing clip and a fixing clip which are adopted in a manner that at the time of fixing a roof molding to a roof groove of a vehicle, the clip can be easily and surely fit to a T-stud without requiring an excessive attention during a fixing work.

A first aspect of the invention provides a molding fixing structure including: a T-stud including a head portion having a predetermined diameter, and an axis portion having a diameter smaller than that of the head portion, the T-stud standing on a roof groove formed on a connecting portion between a center roof panel and a side roof panel of a vehicle body; a roof molding; and a fixing clip including: a pair of mounting plate portions provided on both ends in a longitudinal direction of the fixing clip, each of the mounting plate portions having a pair of engagement hooks on both ends in a width direction thereof which are inwardly projecting and opposing to each other; a base plate portion located between the mounting plate portions at a position lower than positions of the mounting plate portions, the base plate portion having a T-stud insertion hole that is larger than the diameter of the head portion of the T-stud and a T-stud fixing hole a width of which is smaller than the diameter of the head portion of the T-stud and larger than the diameter of the axis portion of the T-stud, the T-stud insertion hole and the T-stud fixing hole being continuous in the longitudinal direction; and connecting plates that connect the base plate portion to the mounting plate portions; wherein the fixing clip is attached to an end portion of the roof molding via the pair of mounting plate portions and the engagement hooks; the T-stud is inserted into the T-stud insertion hole of the fixing clip and then inserted into the T-stud fixing hole by moving the roof molding with respect to the T-stud in a substantially horizontal direction to fix the roof molding to the roof groove via the fixing clip and the T-stud; and the base plate portion of the fixing clip includes: a bottom portion that is positioned lower than a lower surface of the head portion of the T-stud when the T-stud is inserted into the T-stud insertion hole; a guide portion that extends obliquely upward from the bottom portion toward a longitudinal center side of the roof molding, and is in sliding contact with the lower surface of the head portion of the T-stud to guide the head portion when moving the roof molding; and a top portion that is formed in the guide portion and is positioned higher than the lower surface of the head portion when the T-stud is inserted into the T-stud insertion hole.

According to the first aspect of the invention, the bottom portion of the base plate portion of the fixing clip is positioned lower than the lower surface of the head portion of the T-stud when the roof molding is inserted (or pushed) into the roof groove. In this state, when the roof molding is moved in the longitudinal direction of the roof groove, the head portion of the T-stud is inserted into the insertion hole of the clip. Thus, the guide portion extending obliquely upward from the bottom portion of the fixing clip moves under the lower surface of the head portion of the T-stud, then the head portion of the T-stud moves over the top portion and fits into the fixing hole of the fixing clip, whereby the roof molding is fixed to the T-stud through the fixing clip. Thus, when the roof molding being inserted into the roof groove is moved in the longitudinal direction of the roof groove as it is, the clip fixed to the end portion of the roof molding can be easily and surely engaged with the T-stud and so the roof molding can be fixed. Thus, the fixing work of the roof molding can be performed easily without paying excessive attention.

According to a second aspect of the invention, the T-stud insertion hole is formed over the base plate portion and the connecting plate located on a forward end side of the roof molding in a molding moving direction.

The second aspect of the invention has the following effects in addition to the function and effects of the first aspect of the invention. That is, the insertion hole is formed over the base plate portion and the connecting plate on the forward end side of the roof molding, and the base plate portion and the connecting plate disposed lower than the mounting plate portion of the fixing clip. In other words, at least a part of the insertion hole is also provided at the connecting plate on the forward end side of the roof molding which is vertical or slanted in the fixing clip. Thus, at the time of fitting the T-stud into the fixing hole of the fixing clip and fixing the T-stud thereto by moving the roof molding that is fit in the roof groove in the longitudinal direction of the roof groove, there exists no portion interfering with the T-stud on the front side of the fixing clip, whereby the head portion of the T-stud can be inserted more smoothly into the insertion hole of the fixing clip. As a result, the fixing work of the roof molding can be made easier.

According to a third aspect of the invention, the connecting plate located on the forward end side of the roof molding extends obliquely upward from the base plate portion toward the forward end side. Therefore, the head portion of the T-stud can be inserted more smoothly into the insertion hole of the fixing clip, whereby the fixing work of the roof molding can be further facilitated.

According to a fourth aspect of the invention, the base plate portion further includes a lower slanting portion that extends obliquely downward from the top portion toward the longitudinal center side of the roof molding, the lower slanting portion having the T-stud fixing hole; and the T-stud fixing hole is positioned lower than the lower surface of the head portion of the T-stud when the T-stud is inserted into the T-stud insertion hole.

The fourth aspect of the invention has the following effects in addition to the function and effects of one of the first to third aspects of the invention. That is, at the time of moving the roof molding inserted into the roof groove in the longitudinal direction of the roof groove, the roof molding is prevented from moving in the longitudinal direction of the roof groove after the top portion of the fixing clip moves over the T-stud and then the T-stud is engaged with the fixing hole. Thus, after fixing the roof molding, the roof molding hardly comes out of the roof groove and so the fixing state of the roof molding is stabilized. Further, in a state that the T-stud is engaged with the fixing hole of the fixing clip, the lower slanting portion of the base plate portion abuts against the lower surface side of the head portion of the T-stud and is elastically deformed slightly toward the bottom wall side of the roof groove. Therefore, the fixing clip at the end of the roof molding thus elastically deformed continues to apply a restoring force (a force restoring to a direction opposite to the bottom wall side of the roof groove). As a result, the fixing clip is surely engaged with the T-stud by the restoring force of the end portion of the roof molding and so the roof molding moves hardly out of the roof groove.

According to a fifth aspect of the invention, the base plate portion further includes a pair of projections formed on both width sides of a connecting portion between the T-stud insertion hole and the T-stud fixing hole, the projections forming a step with the lower slanting portion.

According to the fifth aspect of the invention, in addition to the function and effects of one of the first to fourth aspects of the invention, when the head portion of the T-stud moves over the projections at the time of the fixing work of the roof molding, a click sound is generated due to the elastic contact between the head portion of the T-stud and the base plate portion of the fixing clip restoring to the original form. Thus, since a worker can confirm that the fixing clip is surely fixed to the T-stud, the working procedure can be made easier.

According to a sixth aspect of the invention, the base plate portion is elastically deformable toward a bottom surface of the roof groove when fixing the roof molding. Thus, at the time of fixing the roof molding, that is, when the top portion of the base plate portion of the fixing clip moves over the stud or thereafter, the base plate portion of the fixing clip elastically deforms toward the bottom wall side of the roof groove. Therefore, the roof molding can be moved easily without requiring a large force when the top portion passes by the T-stud.

According to a seventh aspect of the invention, the fixing clip is formed of a spring metal sheet by press forming. According to an eighth aspect of the invention, the fixing clip is formed of an elastic synthetic resin by injection molding. When the fixing clip is formed by press-forming a spring metal sheet such as a stainless steel sheet or a spring steel sheet, the roof molding is advantageously kept to be fixed stably in a wide usage environment. On the other hand, when the fixing clip is formed by injection-molding elastic synthetic resin such as POM resin or PA resin, the fixing clip can be manufactured easily and prevented from rusting in a wide usage environment.

According to a ninth aspect of the invention, the fixing clip is attached to a portion of the roof molding at which a leg portion of the roof molding is removed. Thus, at the time of fixing the roof molding, the roof molding can be elastically deformed easily toward the bottom wall side of the roof groove, whereby the fixing work of the roof molding can be made easy.

According to a tenth aspect of the invention, there is provided a roof molding to be fixed to a T-stud including a head portion having a predetermined diameter, and an axis portion having a diameter smaller than that of the head portion, the T-stud standing on a roof groove formed on a connecting portion between a center roof panel and a side roof panel of a vehicle body, the roof molding including: a fixing clip including: a pair of mounting plate portions provided on both ends in a longitudinal direction of the fixing clip, each of the mounting plate portions having a pair of engagement hooks on both ends in a width direction thereof which are inwardly projecting and opposing to each other; a base plate portion located between the mounting plate portions at a position lower than positions of the mounting plate portions, the base plate portion having a T-stud insertion hole that is larger than the head portion of the T-stud and a T-stud fixing hole a width of which is smaller than the head portion of the T-stud and larger than the axis portion of the T-stud, the T-stud insertion hole and the T-stud fixing hole being continuous in the longitudinal direction; and connecting plates that connect the base plate portion to the mounting plate portions; wherein the fixing clip is attached to an end portion of the roof molding via the pair of mounting plate portions and the engagement hooks; and the base plate portion of the fixing clip includes: a bottom portion that is positioned lower than a lower surface of the head portion of the T-stud when the T-stud is inserted into the T-stud insertion hole; a guide portion that extends obliquely upward from the bottom portion toward a longitudinal center side of the roof molding; and a top portion that is formed in the guide portion and is positioned higher than the lower surface of the head portion when the T-stud is inserted into the T-stud insertion hole.

According to an eleventh aspect of the invention, there is provided a fixing clip to be attached to a roof molding, the fixing clip fixing the roof molding to a T-stud including a head portion having a predetermined diameter and an axis portion having a diameter smaller than that of the head portion, the T-stud standing on a roof groove formed on a connecting portion between a center roof panel and a side roof panel of a vehicle body, the fixing clip including: a pair of mounting plate portions provided on both ends in a longitudinal direction of the fixing clip, each of the mounting plate portions having a pair of engagement hooks on both ends in a width direction thereof which are inwardly projecting and opposing to each other; a base plate portion located between the mounting plate portions at a position lower than positions of the mounting plate portions, the base plate portion having a T-stud insertion hole that is larger than the head portion of the T-stud and a T-stud fixing hole a width of which is smaller than the head portion of the T-stud and larger than the axis portion of the T-stud, the T-stud insertion hole and the T-stud fixing hole being continuous in the longitudinal direction; and connecting plates that connect the base plate portion to the mounting plate portions; wherein the fixing clip is attachable to an end portion of the roof molding via the pair of mounting plate portions and the engagement hooks; and the base plate portion includes: a bottom portion that is positioned lower than a lower surface of the head portion of the T-stud when the T-stud is inserted into the T-stud insertion hole; a guide portion that extends obliquely upward from the bottom portion toward a longitudinal center side of the roof molding; and a top portion that is formed in the guide portion and is positioned higher than the lower surface of the head portion when the T-stud is inserted into the T-stud insertion hole.

According to the tenth and eleventh aspects of the invention, substantially the same function and effects as the first aspect of the invention can be attained.

According to the invention, in a state where the roof molding is inserted into the roof groove and the bottom portion of the base plate portion of the fixing clip is positioned lower than the lower surface of the head portion of the T-stud, when the roof molding is moved in the longitudinal direction of the roof groove, the head portion of the T-stud is inserted into the insertion hole of the clip. Thus, the guide portion extending obliquely upward from the bottom portion of the fixing clip moves under the lower surface of the head portion of the T-stud, then the head portion of the T-stud moves over the top portion and fits into the fixing hole of the fixing clip, whereby the roof molding is fixed to the T-stud through the fixing clip. Thus, when the roof molding being inserted into the roof groove is moved in the longitudinal direction of the roof groove as it is, the clip fixed to the end portion of the roof molding can be easily and surely engaged with the T-stud and so the roof molding can be fixed. Thus, the fixing work of the roof molding can be performed easily.

DETAILED DESCRIPTION OF THE PREFERRED EMBODIMENTS

Hereinafter, the invention will be explained in detail with reference to the mode for carrying out the invention.

Figure 1:
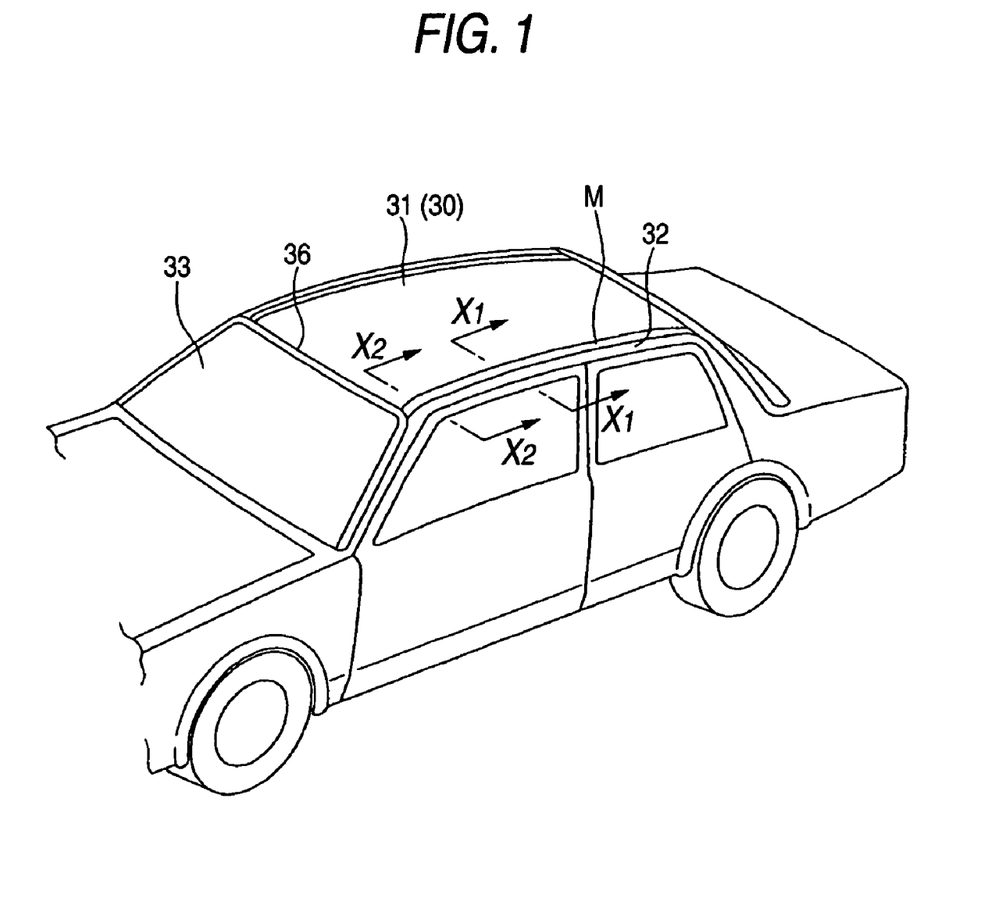
FIG. 1 is a perspective view of an automobile in which a roof molding is attached to a roof groove, according to a configuration of the invention.
Figure 2:
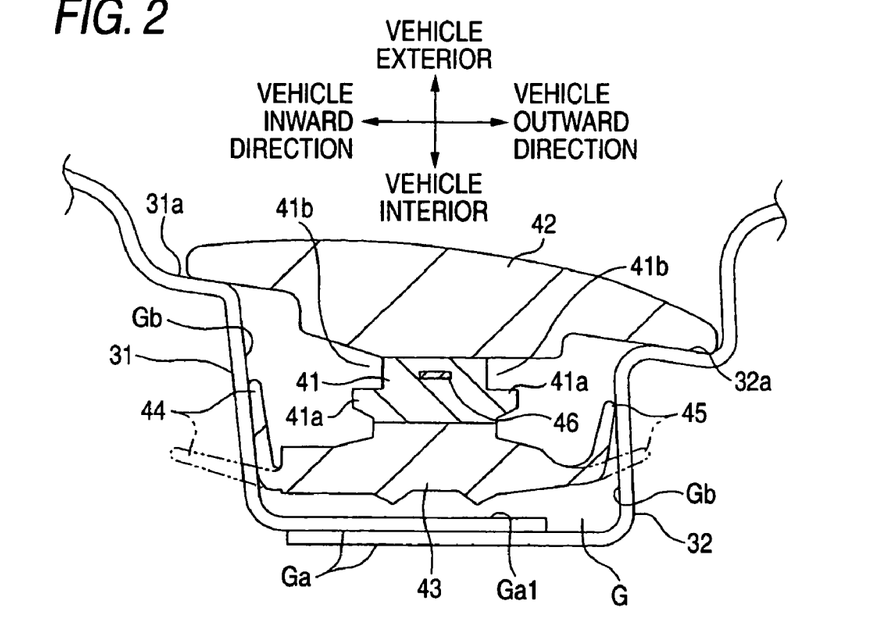
FIG. 2 is a sectional view taken along a line $X_1$—$X_1$ in FIG. 1.
Figure 3:
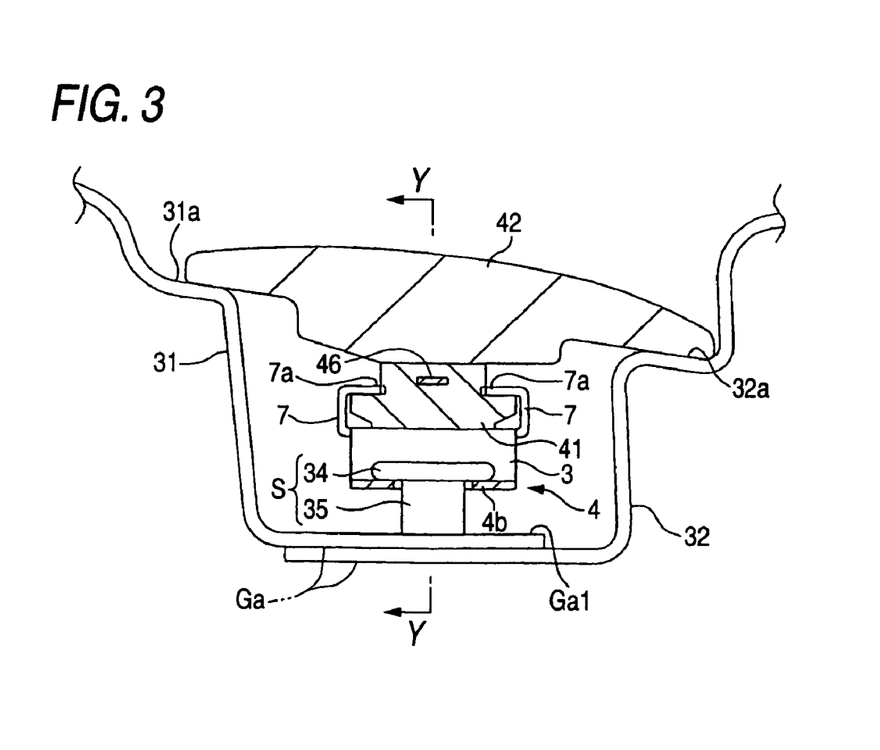
FIG. 3 is a sectional view taken along a line $X_2$—$X_2$ in FIG. 1.
Figure 4:
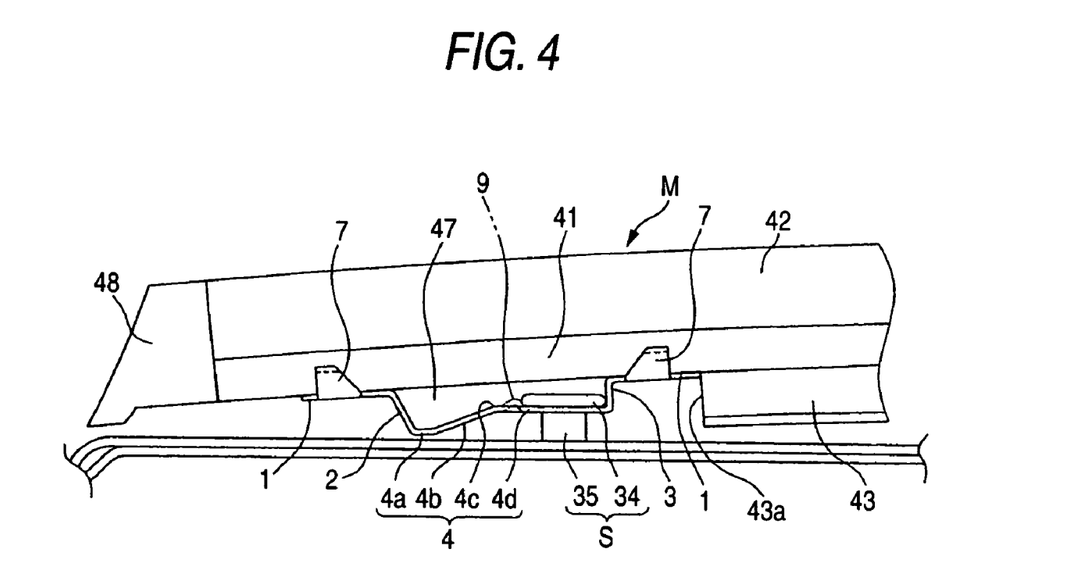
FIG. 4 is a sectional view taken along a line Y—Y in FIG. 3.

FIG. 1 is a perspective view of an automobile in which a roof molding M is attached to a roof groove G, according to a configuration of the invention. FIG. 2 is a sectional view taken along a line $X_1$—$X_1$ in FIG. 1. FIG. 3 is a sectional view taken along a line $X_2$—$X_2$ in FIG. 1, and FIG. 4 is a sectional view taken along a line Y—Y in FIG. 3. In FIGS. 1 to 3, end portions in a vehicle width direction of a center roof panel 31 and a side roof panel 32 constituting a roof 30 of a vehicle are overlapped by a predetermined width thereby to be integrally joined to each other. A roof groove G is formed at the joined portion along a longitudinal direction of the vehicle and a roof molding M is fit into the roof groove G. A T-stud S is stood at an end portion on a front windowpane 33 side within the roof groove G. The T-stud S includes a head portion 34 of a circular disc shape having an outer diameter (D1) and an axis portion 35 having an outer diameter (D2) smaller than that of the head portion 34. A lower end portion of the axis portion 35 is fixed to a groove bottom wall Ga of the roof groove G by welding, whereby the T-stud S is stood within the roof groove G.

The roof molding M according to the embodiment is an extrusion molding product (two-color extrusion molding product) formed by extrusion-molding two kinds of olefin based thermoplastic elastomer material (TPO), styrene based thermoplastic elastomer material (SBC) or rubber material (hereinafter called "rubber material") having different hardness. The roof molding M is configured by integrally forming a main body 41 which is entirely housed within the roof groove G, an ornament portion 42 which is integrally formed with a vehicle exterior side surface of the main body 41 in a thickness direction of the main body 41 to cover an opening of the roof groove G, and a leg portion 43 which is integrally formed with a vehicle interior side of the main body. Elastically deformable mounting lips 44, 45 for elastically engaging with opposing groove side walls Gb of the roof groove G are integrally formed at both sides of the leg portion 43 in the width direction thereof, respectively. A pair of longitudinal projections 41a are formed at both side surfaces of the main body 41 along the longitudinal direction thereof. A concave portion 41b is formed between the longitudinal projection 41a and the lower surface of the ornament portion 42. In the roof molding M, the main body 41 is formed by hard rubber which is relatively harder than the ornament portion 42 and the remaining portion of the roof molding is formed by soft rubber. A reinforcing core metal strip 46 is embedded within the main body 41. An end cap 48 positioned on an upper window molding 36 side of the front windowpane 33 in a state that the roof molding M is fixed to the roof groove G is integrally formed by terminal injection molding at a tip end of the roof molding M. In FIG. 2, two-dot chain lines of the leg portions 43 show a free state prior to the elastic deformation of the mounting lips 44, 45.

Figure 5:
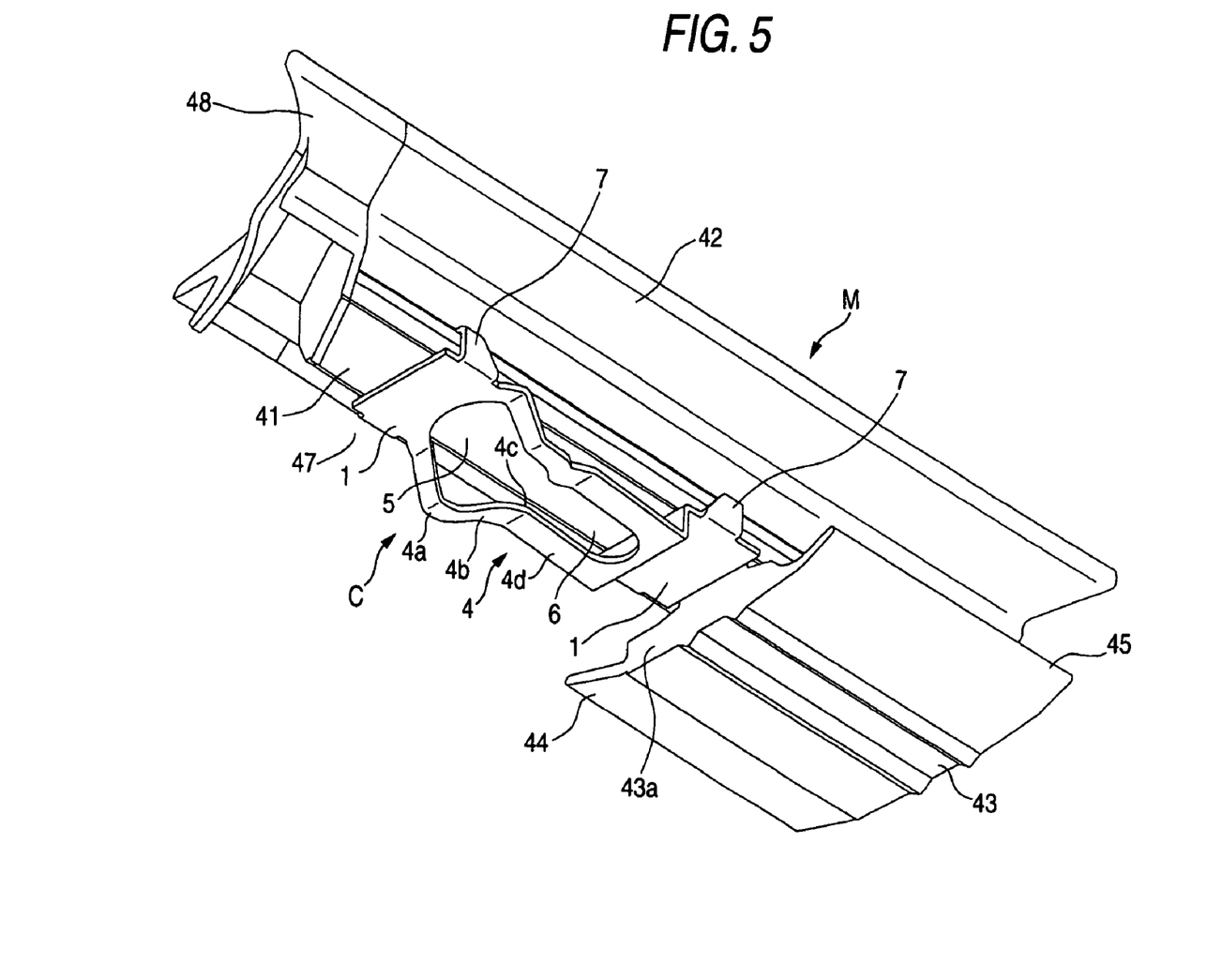
FIG. 5 is a perspective view, seen from a lower surface side of the roof molding, which shows a state where a fixing clip is fixed to a molding main body at a position corresponding to a space portion at an end portion of the roof molding.
Figure 6:
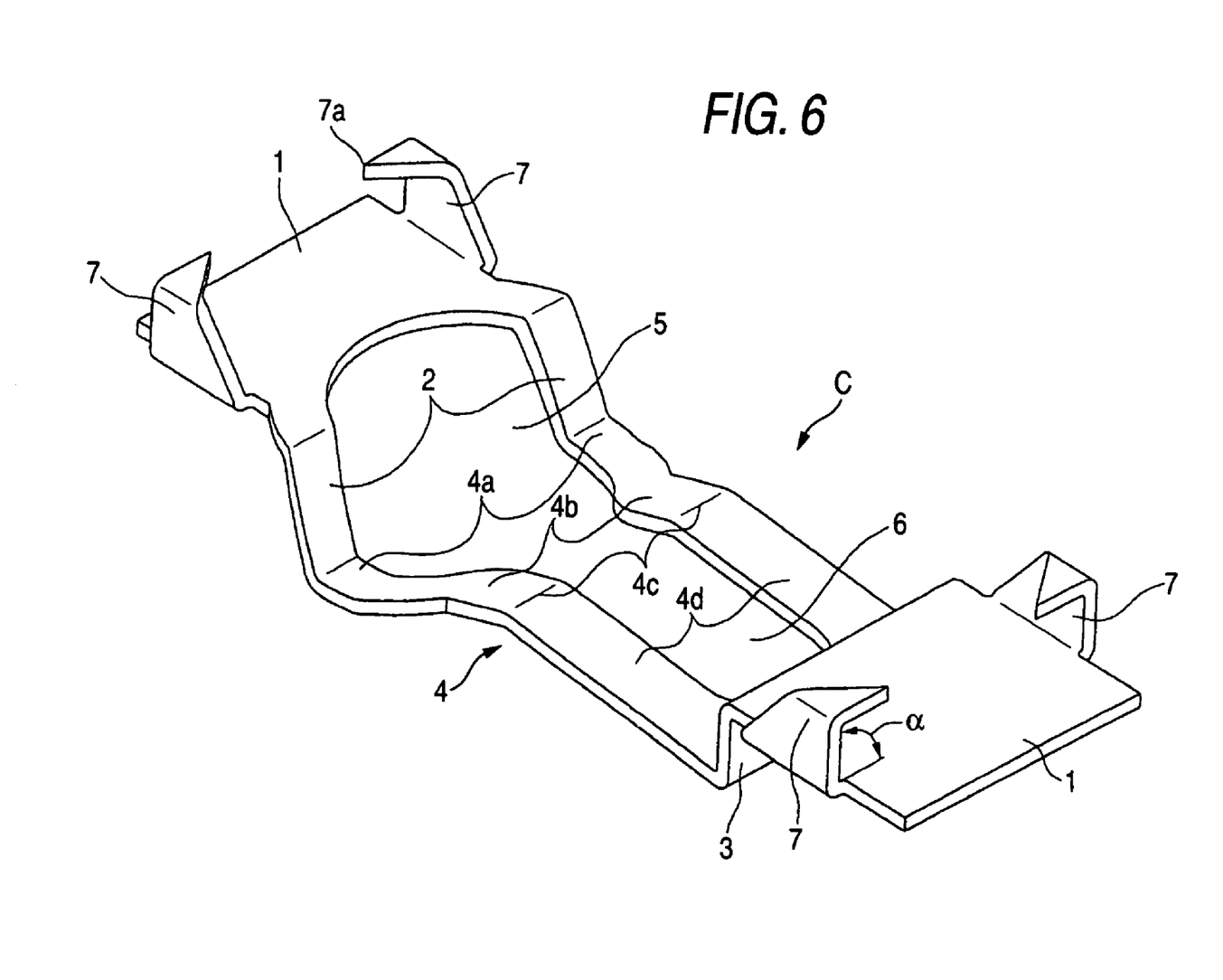
FIG. 6 is a perspective view of the fixing clip seen from a front surface side thereof.
Figure 7A:
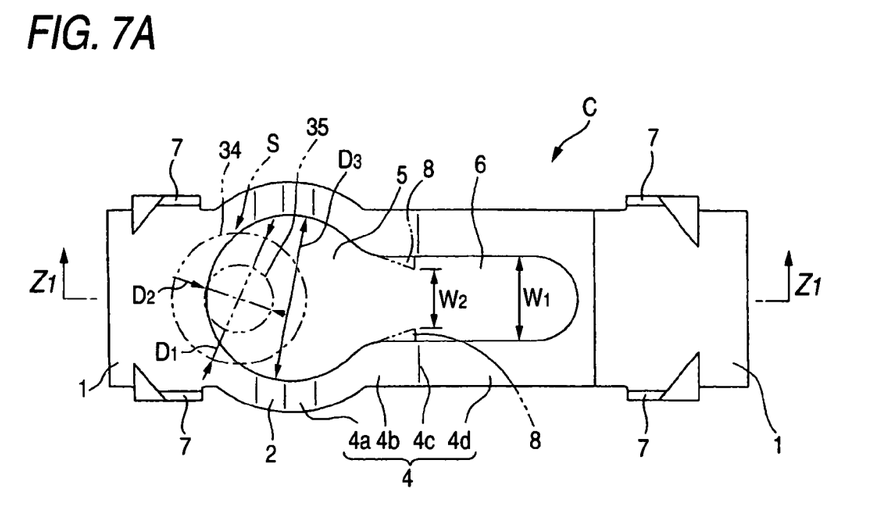
FIG. 7A is a plan view of the fixing clip before attaching the roof molding.
Figure 7B:
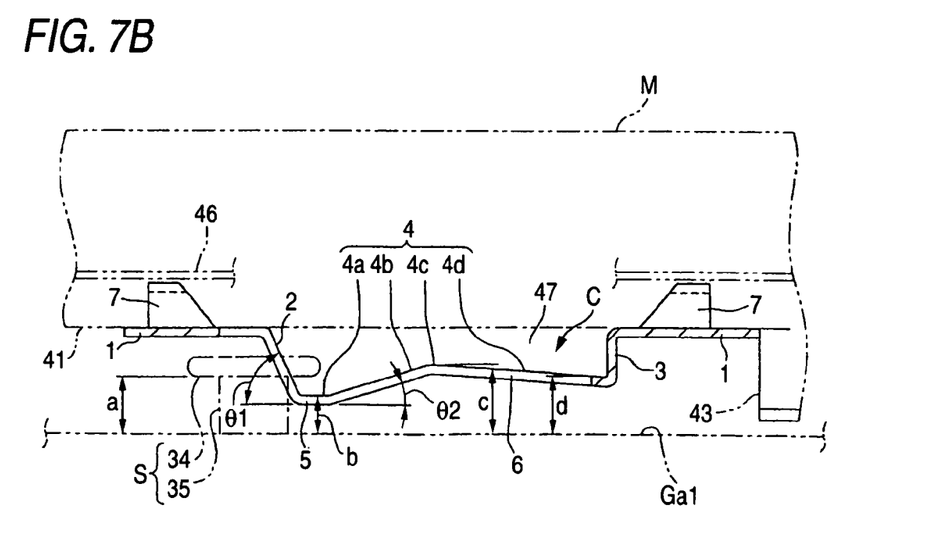
FIG. 7B is a sectional view taken along a line $Z_1$—$Z_1$ in FIG. 7A.

FIG. 5 is a perspective view, seen from a lower surface side of the roof molding M, which shows a state where a fixing clip C is fixed to a position of the main body 41 corresponding to the space portion 47 at the end portion of the roof molding M. FIG. 6 is a perspective view of the fixing clip C seen from an upper surface side thereof. FIG. 7A is a plan view of the fixing clip C and FIG. 7B is a sectional view taken along a line $Z_1$—$Z_1$ in FIG. 7A. The end portion of the roof molding M on the front windowpane 33 side is configured that the main body 41 is exposed by removing the leg portion 43. The fixing clip C is attached to a bottom surface of the main body 41 exposed at the space portion 47. A pair of the longitudinal projections 41a are formed at the both side surfaces of the main body 41. The fixing clip C is fixed to the main body 41 by engagement hooks in a manner that two pairs of the engagement hooks 7 spaced in the longitudinal direction hold the main body 41 having the longitudinal projections 41a from the lower side thereof.

According to the invention, the end portion of the roof molding M is fixed to the roof groove G by the T-stud S stood on the groove bottom wall Ga of the roof groove G and the fixing clip C which is fixed in the aforesaid manner to the position of the main body 41 corresponding to the space portion 47 of the end portion of the roof molding. The fixing clip C is configured so as to be elastically deformable since it is formed by press-forming a spring metal sheet or injection-molding an elastic synthetic resin. In this embodiment, as shown in FIGS. 5, 7A and 7B, the fixing clip C is made of a spring metal sheet. The base plate portion 4 is integrally formed at the position lower than the mounting plate portions 1 through first and second connecting plates 2,3 that are disposed between the mounting plate portions 1, 1 at the both ends in the longitudinal direction (a direction coincident with the longitudinal direction of the fixing clip in a state where the fixing clip is fixed to the roof molding M) in a state where the fixing clip is fixed to the lower surface side of the roof molding M in the aforesaid manner. In the state where the roof molding M is fixed to the roof groove G through the fixing clip C and the T-stud S, the base plate portion 4 includes a bottom portion 4a disposed at the lowest position, a guide portion 4b which extends obliquely upward from the bottom portion 4a toward a longitudinal center side of the roof molding M and is in sliding contact with the lower surface of the head portion 34 of the T-stud S to guide the head portion when moving the roof molding M, a top portion 4c that is formed in the guide portion 4b and is positioned higher than the lower surface of the head portion 34 of the T-stud S, and a lower slanting portion 4d which extends obliquely downward from the top portion 4c toward the longitudinal center side of the roof molding M.

As shown in FIGS. 7A and 7B, supposing that distances from the bottom surface $Ga_1$ of the roof groove G to the lower surface of the head portion 34 of the T-stud S, to the upper surface of the bottom portion 4a, to the upper surface of the top portion 4c, and to the upper surface of the connection portion between the lower slanting portion 4d and the second connecting plate 3 are defined as a, b, c and d, respectively, these values are set to keep the relation of (c>d>a>b). Further, in the first connecting plate 2 of the fixing clip C, an angle ($\theta_1$) between the lower surface of the first connecting plate and the horizontal line is set to be smaller than 90 degrees. The first connecting plate extends obliquely upward toward the tip end side (the front windowpane 33 side) of the roof molding M. The angle ($\theta_1$) and an angle ($\theta_2$) between the lower surface of the guide portion 4b and the horizontal line are set to keep the relation of ($\theta 2<\theta 1<90$ degrees). The second connecting plate 3 is disposed almost vertically in a state that the roof molding M is fixed to the roof groove G. The angle ($\theta_1$) may be 90 degrees or may be larger than 90 degrees. The angle of the second connecting plate 3 may also not be orthogonal with respect to the bottom surface Ga1 of the roof groove G but may extend obliquely upward or downward in the longitudinal direction.

Further, a T-stud insertion hole 5 of an almost circular shape having an inner diameter ($D_3$) larger than the outer diameter ($D_1$) of the head portion 34 of the T-stud S is formed over the first connecting plate 2 and the guide portion 4b of the base plate portion 4. A T-stud fixing hole 6 of an elongated shape having a width ($W_1$) almost equal to or slightly larger than the outer diameter ($D_2$) of the axis portion 35 of the T-stud S is formed so as to extend from the guide portion 4b to the top portion 4c on the second connecting plate 3 side of the T-stud insertion hole 5. The outer diameter ($D_1$) of the head portion 34 of the T-stud S, the outer diameter ($D_2$) of the axis portion of the T-stud S, the inner diameter ($D_3$) of the T-stud insertion hole 5 and the width ($W_1$) of the T-stud fixing hole 6 are set to keep the relation of ($D_1>D_2$, $D_3>D_1$, $D_1>W_1\geqq D_2$). Thus, when the head portion 34 of the T-stud S is inserted into the T-stud insertion hole 5 of the fixing clip C and then the fixing clip C is moved with respect to the T-stud S, the axis portion 35 of the T-stud S is inserted into the T-stud fixing hole 6. In this insertion state, the T-stud fixing hole 6 of the fixing clip C is engaged with the axis portion 35 of the T-stud S and so the head portion 34 of the T-stud S is prevented from sliding out of the T-stud fixing hole 6 of the fixing clip C. At each of the mounting plate portions 1, 1 of the fixing clip C in the longitudinal direction thereof, a pair of the engagement hooks 7 are formed to extend inward in an opposite manner from the both sides of the mounting plate portion 1 in its width direction. As shown in FIG. 6, each of the engagement hooks 7 extends obliquely upward so as to form an obtuse angle ($\alpha$) with respect to the mounting plate portion 1. An almost upper portion of each of the engagement hooks 7 is bent almost at a right angle inward in a manner that the bite portions 7a (see FIGS. 3 and 6) of the tip ends of the engagement hooks bite the both side surfaces of the main body 41 at the corresponding positions of the space portion 47 of the roof molding M thereby to firmly mount the fixing clip C to the main body 41 at the corresponding positions of the space portion 47.

As shown in FIGS. 3 to 5, the fixing clip C is mounted to the portion of the main body 41 corresponding to the space portion 47 at which the leg portion 43 at the tip end of the roof molding M is removed and so the lower surface of the main body 41 is exposed. That is, in a state that the mounting plate portions 1 at the both ends of the fixing clip C in the longitudinal direction thereof are abutted against the lower surface of the main body 41 at the tip end portion of the roof molding M and the bite portions 7a of the engagement hooks 7 integrally formed with the mounting plate portions 1 of the fixing clip C are made correspond to the concave portions 41b at the both sides of the main body 41, each of the engagement hooks 7 is entirely pushed inward and bent almost at a right angle with respect to the mounting plate portion 1 thereby to slightly bite the portion 7a at the tip end portion of the engagement hook into the side surface of the main body 41. Thus, the fixing clip C can be firmly fixed to the position of the main body 41 corresponding to the space portion 47 of the tip end portion of the roof molding M. In this embodiment, before the roof molding M fixed with the fixing clip C is fixed to the roof groove G, the end surface of the fixing clip C on the longitudinal center side of the roof molding M is abutted and so positioned in the longitudinal direction against the end surface 43a of the leg portion 43 which is formed by forming the space portion 47 at the tip end portion of the roof molding M. Further, the head portion 34 of the T-stud S abuts against the second connecting plate 3 of the fixing clip C. When the fixing clip C is an injection molding product of elastic synthetic resin, the aforesaid bending procedure of the engagement hooks 7 is not required and the fixing work of the fixing clip C can be completed by merely pressing the fixing clip C.

Figure 8A:
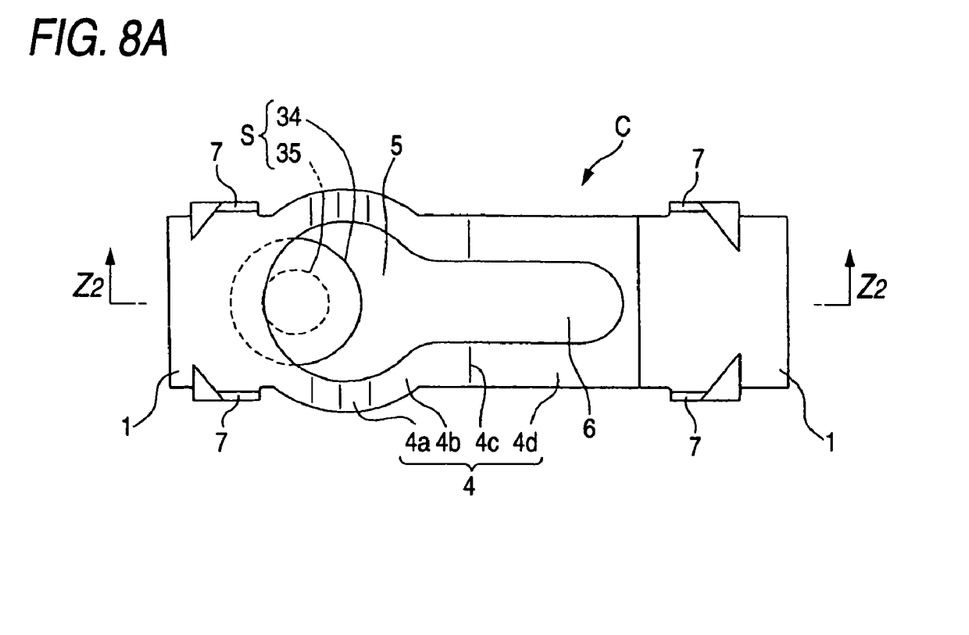
FIG. 8A is a plan view just after a forward portion of the roof molding attached with the fixing clip is inserted into the roof groove.
Figure 8B:
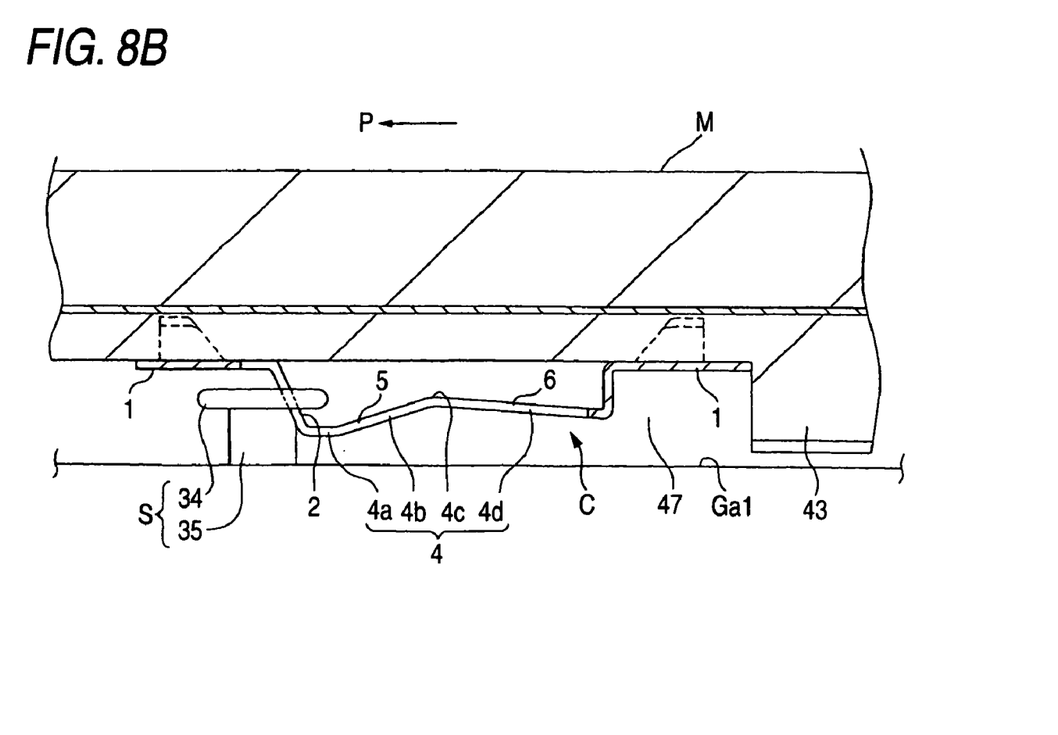
FIG. 8B is a sectional view taken along a line $Z_2$—$Z_2$ in FIG. 8A.

Then, the roof molding M, in which the fixing clip C is attached to the position of the main body 41 corresponding to the space portion 47 at the tip end portion of the roof molding, can be fixed to the roof groove G in the following manner. First, as shown in FIGS. 8A and 8B, the tip end portion of the roof molding M is partially inserted into the roof groove G in a state that the roof molding M is slightly shifted to the longitudinal center side from the fixing position of the roof molding M in the longitudinal direction of the roof groove G. Thus, as shown in FIG. 3, the both end portions in the width direction of the ornament portion 42 of the roof molding M elastically abut against the step portions 31a, 32a of the center roof panel 31 and the side roof panel 32, respectively, thereby to define the height of the tip end portion of the roof molding M with respect to the roof groove G (accurately, the bottom surface Ga1 of the roof groove G). The size relation of the respective portions of the base plate portion 4 of the fixing clip C with respect to the bottom surface $Ga_1$ of the roof groove G and the lower surface of the head portion 34 of the T-stud S in this insertion state of the roof molding M is described above.

Figure 9A:
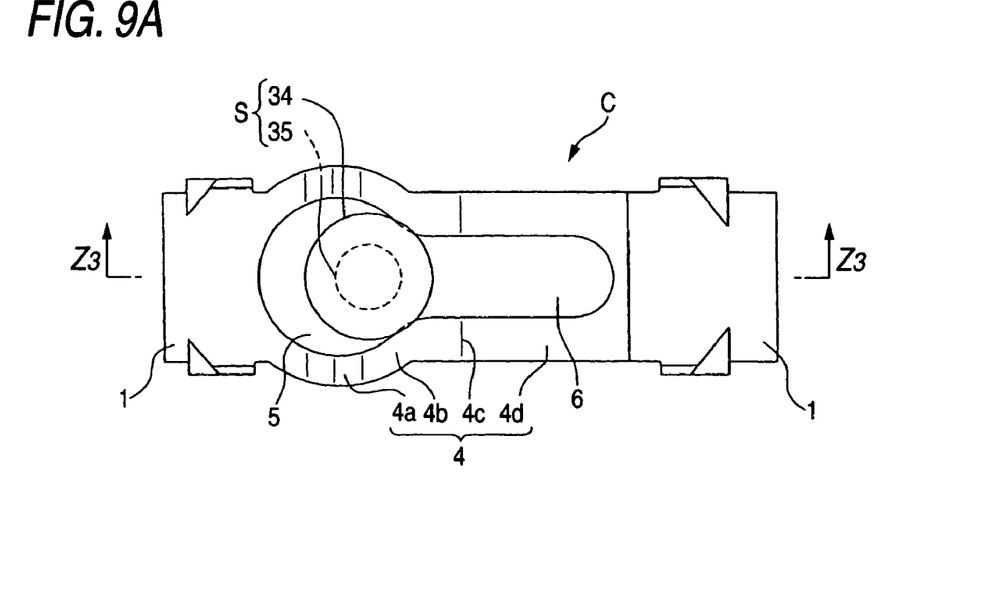
FIG. 9A is a plan view showing a state where a guide portion is moved under the lower surface of the head portion of the T-stud by moving the roof molding attached with the fixing clip.
Figure 9B:
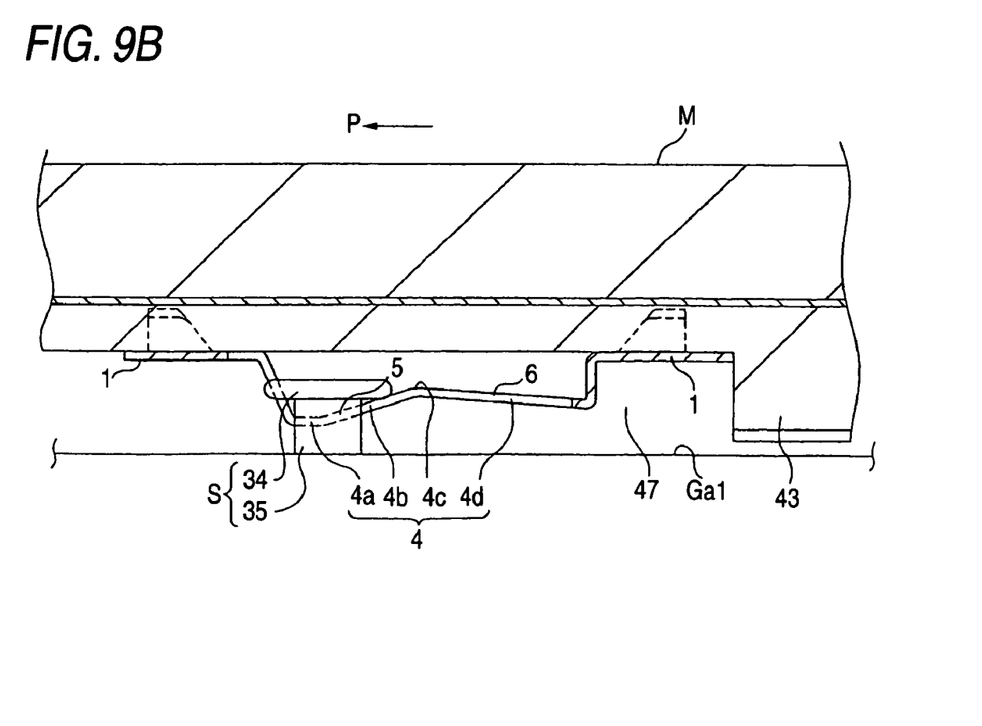
FIG. 9B is a sectional view taken along a line $Z_3$—$Z_3$ in FIG. 9A.
Figure 10A:
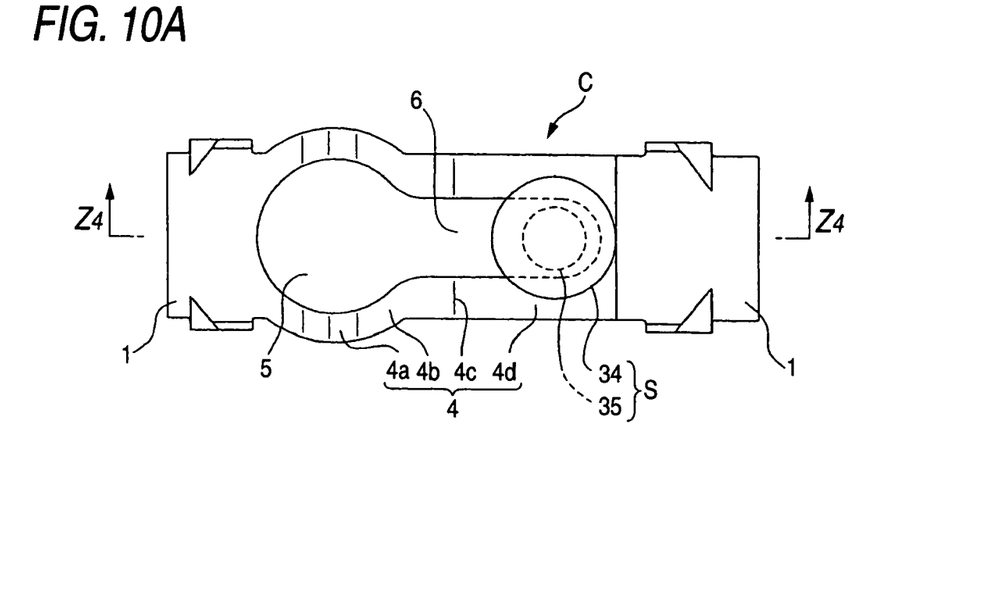
FIG. 10A is a plan view showing a state where the forward end portion of the roof molding attached with the fixing clip is attached to the roof groove.
Figure 10B:
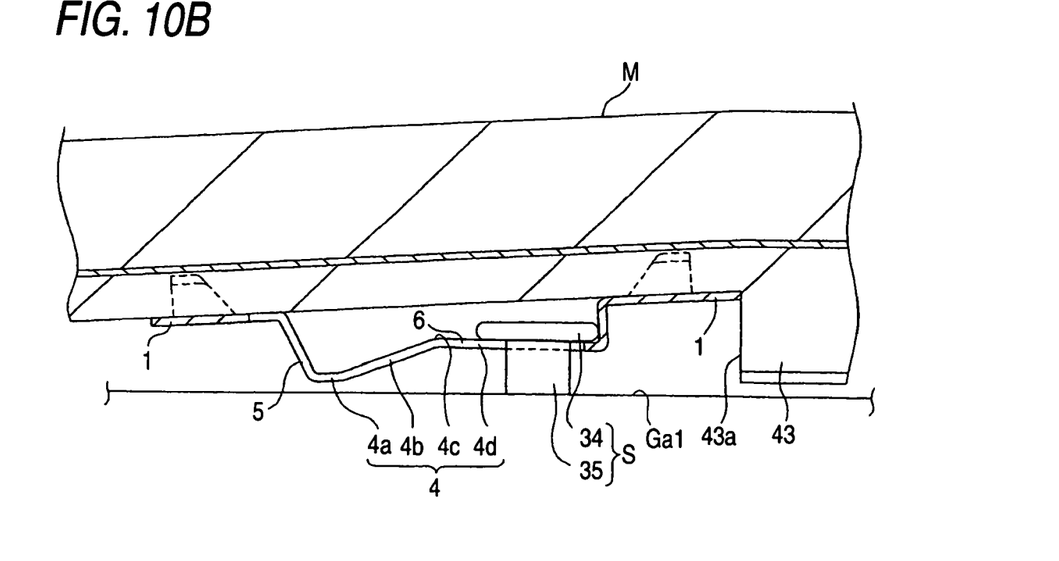
FIG. 10B is a sectional view taken along a line $Z_4$—$Z_4$ in FIG. 10A.

Thus, as shown in FIGS. 8A and 8B, in the state where the roof molding M is inserted into the roof groove G in the aforesaid manner, the bottom portion 4a constituting the base plate portion 4 of the fixing clip C which is fixed to the position of the main body 41 corresponding to the space portion 47 of the roof molding M is positioned lower than the lower surface of the head portion 34 of the T-stud S stood within the roof groove G. In this state, when the roof molding M is moved to the front side (the front windowpane 33 side) of the vehicle shown by an arrow P along the longitudinal direction of the roof groove G, the head portion 34 of the T-stud S is inserted into the T-stud insertion hole 5 of the fixing clip C without causing the interference between the T-stud and the fixing clip C since the T-stud insertion hole 5 having the inner diameter ($D_3$) larger than the outer diameter ($D_1$) of the head portion 34 of the T-stud S is formed from the first connecting plate 2 of the fixing clip C to the base plate portion 4. Subsequently, when the roof molding M is moved in the aforesaid direction, as shown in FIGS. 9A and 9B, the guide portion 4b extending obliquely upward from the bottom portion 4a of the fixing clip C slides under the lower surface of the head portion 34 of the T-stud S, then the head portion 34 of the T-stud S moves over the top portion 4c and fits into the T-stud fixing hole 6 of the fixing clip C. As a result, as shown in FIGS. 10A and 10B, the tip end portion of the roof molding M is fixed to the roof groove G through the T-stud S and the fixing clip C in a state that the lower slanting portion 4d constituting the base plate portion 4 of the fixing clip C abuts against the lower surface of the head portion 34 of the T-stud S. In this respect, the fixing clip C is formed of a spring metal sheet or elastic synthetic resin and so elastically deformable. Thus, the base plate portion 4 of the fixing clip C elastically deforms toward the bottom surface Ga1 side of the roof groove G when the top portion 4c constituting the base plate portion 4 of the fixing clip C moves over the T-stud S or thereafter. Therefore, the roof molding M can advantageously be moved easily without requiring a large force when the top portion 4c passes by the T-stud S (accurately, the head portion 34 of the T-stud S).

Further, the fixing clip C is elastically deformable, and the lower slanting portion 4d constituting the base plate portion 4 abuts against the lower surface of the head portion 34 of the T-stud S in a state that the tip end portion of the roof molding M is fixed to the roof groove G through the T-stud S and the fixing clip C. Thus, the roof molding M is fixed to the roof groove G in a state that the tip end portion of the roof molding is elastically deformed toward the bottom surface Ga1 side of the roof groove G in a united manner with the fixing clip C. Therefore, the tip end portion of the roof molding M thus elastically deformed continues to apply a restoring force (a force restoring to a direction opposite to the bottom surface $Ga_1$ of the roof groove G). As a result, the fixing clip C is surely engaged with the T-stud S by the restoring force of the tip end portion of the roof molding M and so the roof molding M moves hardly out of the roof groove G.

When the remaining portion other than the tip end portion of the roof molding M is sequentially inserted into the roof groove G from the front side of the vehicle toward the rear side thereof after the tip end portion of the roof molding M is fixed into the roof groove G through the fixing clip C and the T-stud S, the mounting lips 44, 45 at the both sides of the leg portion 43 are elastically deformed and bent inwardly and elastically abut against the groove side wall Gb of the roof groove G as shown in FIG. 2. Thus, the roof molding is fixed to the roof groove G by the elastic restoring force of the mounting lips.

In this manner, when the tip end portion of the roof molding M is inserted into the roof groove G and then the roof molding M is moved in the longitudinal direction thereof, the fixing clip C attached to the space portion of the roof molding M is engaged with the T-stud S stood within the roof groove G, whereby the tip end portion of the roof molding M is easily fixed to the roof groove G. Thus, the fixing work of the roof molding M can be performed easily without paying excessive attention.

Further, as shown in FIG. 7A, at the inlet portion connecting the T-stud fixing hole 6 and the T-stud insertion hole 5 of the fixing clip C, a pair of the elastically-deformable projections 8, 8 are integrally formed in an opposite manner inwardly at the top portion 4c or a portion close thereto in a manner that they are spaced with a distance ($W_2$) equal to or slightly smaller than the outer diameter ($D_2$) of the axis portion 35 of the T-stud S. In such a configuration, even when a force is applied to the fixing clip C in the direction opposite to the fixing direction after the fixing work of the roof molding, the axis portion 35 is caught by the projections 8, 8, so that the fixing clip is prevented from moving in the opposite direction. As a result, the roof molding M is prevented from shifting in the longitudinal direction and coming out of the roof groove.

A pair of projections 9, 9 may be integrally formed at the fixing clip in place of the projections 8, 8 or together with the projections 8, 8. As shown by a two-dot chain line in FIG. 4, a pair of the projections 9, 9 protrude to the lower surface side of the roof molding M at a pair of the top portions 4c, 4c spaced apart in the width direction and also protrude from the lower slanting portion 4d. This configuration can attain the following effects in addition to the aforesaid coming-out preventing effects. That is, when the head portion 34 of the T-stud S moves over the projections 9, 9 at the time of the fixing work of the roof molding m, a click sound is generated due to the elastic contact between the head portion 34 of the T-stud S and the base plate portion 4 of the fixing clip C restoring to the original form. Thus, since a worker can confirm that the fixing clip C is surely fixed to the T-stud S, the working procedure can be made easier.

Incidentally, when the fixing clip C is formed by press-forming a spring metal sheet, the roof molding M is advantageously kept to be fixed stably in a wide usage environment. When the fixing clip is formed by injection-molding elastic synthetic resin, the fixing clip can be manufactured easily and prevented from rusting in a wide usage environment.

What is claimed is:

1. A molding fixing structure comprising:
  a T-stud including a head portion having a predetermined diameter, and an axis portion having a diameter smaller than that of the head portion, the T-stud standing on a roof groove formed on a connecting portion between a center roof panel and a side roof panel of a vehicle body;
  a roof molding; and
  a fixing clip including:
    a pair of mounting plate portions provided on both ends in a longitudinal direction of the fixing clip, each of the mounting plate portions having a pair of engagement hooks on both ends in a width direction thereof which are inwardly projecting and opposing to each other;
    a base plate portion located between the mounting plate portions at a position lower than positions of the mounting plate portions, the base plate portion having a T-stud insertion hole that is larger than the diameter of the head portion of the T-stud and a T-stud fixing hole a width of which is smaller than the diameter of the head portion of the T-stud and larger than the diameter of the axis portion of the T-stud, the T-stud insertion hole and the T-stud fixing hole being continuous in the longitudinal direction; and
    connecting plates that connect the base plate portion to the mounting plate portions;
  wherein the fixing clip is attached to an end portion of the roof molding via the pair of mounting plate portions and the engagement hooks;
  the T-stud is inserted into the T-stud insertion hole of the fixing clip and then inserted into the T-stud fixing hole by moving the roof molding with respect to the T-stud in a substantially longitudinal direction to fix the roof molding to the roof groove via the fixing clip and the T-stud; and
  the base plate portion of the fixing clip includes:
    a bottom portion that is positioned lower than a lower surface of the head portion of the T-stud when the T-stud is inserted into the T-stud insertion hole;
    a guide portion that extends obliquely upward from the bottom portion toward a longitudinal center side of the roof molding, and is in sliding contact with the lower surface of the head portion of the T-stud to guide the head portion when moving the roof molding; and
    a top portion that is formed in the guide portion and is positioned higher than the lower surface of the head portion when the T-stud is inserted into the T-stud insertion hole.

2. The molding fixing structure according to claim 1, wherein the T-stud insertion hole is formed over the base plate portion and the connecting plate located on a forward end side of the roof molding in a molding moving direction.

3. The molding fixing structure according to claim 2, wherein the connecting plate located on the forward end side of the roof molding extends obliquely upward from the base plate portion toward the forward end side.

4. The molding fixing structure according to claim 1, wherein the base plate portion further includes a lower slanting portion that extends obliquely downward from the top portion toward the longitudinal center side of the roof molding, the lower slanting portion having the T-stud fixing hole; and
  the T-stud fixing hole is positioned lower than the lower surface of the head portion of the T-stud when the T-stud is inserted into the T-stud insertion hole.

5. The molding fixing structure according to claim 4, wherein the base plate portion further includes a pair of projections formed on both width sides of a connecting portion between the T-stud insertion hole and the T-stud fixing hole, the projections forming a step with the lower slanting portion.

6. The molding fixing structure according to claim 1, wherein the base plate portion is elastically deformable toward a bottom surface of the roof groove when fixing the roof molding.

7. The molding fixing structure according to claim 1, wherein the fixing clip is formed of a spring metal sheet bypress forming.

8. The molding fixing structure according to claim 1, wherein the fixing clip is formed of an elastic synthetic resin by injection molding.

9. The molding fixing structure according to claim 1, wherein the fixing clip is attached to a portion of the roof molding at which a leg portion of the roof molding is removed.

10. A roof molding to be fixed to a T-stud including a head portion having a predetermined diameter, and an axis portion having a diameter smaller than that of the head portion, the T-stud standing on a roof groove formed on a connecting portion between a center roof panel and a side roof panel of a vehicle body, the roof molding comprising:
  a fixing clip including:
    a pair of mounting plate portions provided on both ends in a longitudinal direction of the fixing clip, each of the mounting plate portions having a pair of engagement hooks on both ends in a width direction thereof which are inwardly projecting and opposing to each other;

a base plate portion located between the mounting plate portions at a position lower than positions of the mounting plate portions, the base plate portion having a T-stud insertion hole that is larger than the head portion of the T-stud and a T-stud fixing hole a width of which is smaller than the head portion of the T-stud and larger than the axis portion of the T-stud, the T-stud insertion hole and the T-stud fixing hole being continuous in the longitudinal direction; and connecting plates that connect the base plate portion to the mounting plate portions;

wherein the fixing clip is attached to an end portion of the roof molding via the pair of mounting plate portions and the engagement hooks; and the base plate portion of the fixing clip includes:
  a bottom portion that is positioned lower than a lower surface of the head portion of the T-stud when the T-stud is inserted into the T-stud insertion hole;
  a guide portion that extends obliquely upward from the bottom portion toward a longitudinal center side of the roof molding; and
  a top portion that is formed in the guide portion and is positioned higher than the lower surface of the head portion when the T-stud is inserted into the T-stud insertion hole.

11. A fixing clip to be attached to a roof molding, the fixing clip fixing the roof molding to a T-stud including a head portion having a predetermined diameter and an axis portion having a diameter smaller than that of the head portion, the T-stud standing on a roof groove formed on a connecting portion between a center roof panel and a side roof panel of a vehicle body, the fixing clip comprising:

a pair of mounting plate portions provided on both ends in a longitudinal direction of the fixing clip, each of the mounting plate portions having a pair of engagement hooks on both ends in a width direction thereof which are inwardly projecting and opposing to each other;

a base plate portion located between the mounting plate portions at a position lower than positions of the mounting plate portions, the base plate portion having a T-stud insertion hole that is larger than the head portion of the T-stud and a T-stud fixing hole a width of which is smaller than the head portion of the T-stud and larger than the axis portion of the T-stud, the T-stud insertion hole and the T-stud fixing hole being continuous in the longitudinal direction; and connecting plates that connect the base plate portion to the mounting plate portions;

wherein the fixing clip is attachable to an end portion of the roof molding via the pair of mounting plate portions and the engagement hooks; and the base plate portion includes:
  a bottom portion that is positioned lower than a lower surface of the head portion of the T-stud when the T-stud is inserted into the T-stud insertion hole;
  a guide portion that extends obliquely upward from the bottom portion toward a longitudinal center side of the roof molding; and
  a top portion that is formed in the guide portion and is positioned higher than the lower surface of the head portion when the T-stud is inserted into the T-stud insertion hole.

\* \* \* \* \*